UNITED STATES PATENT OFFICE.

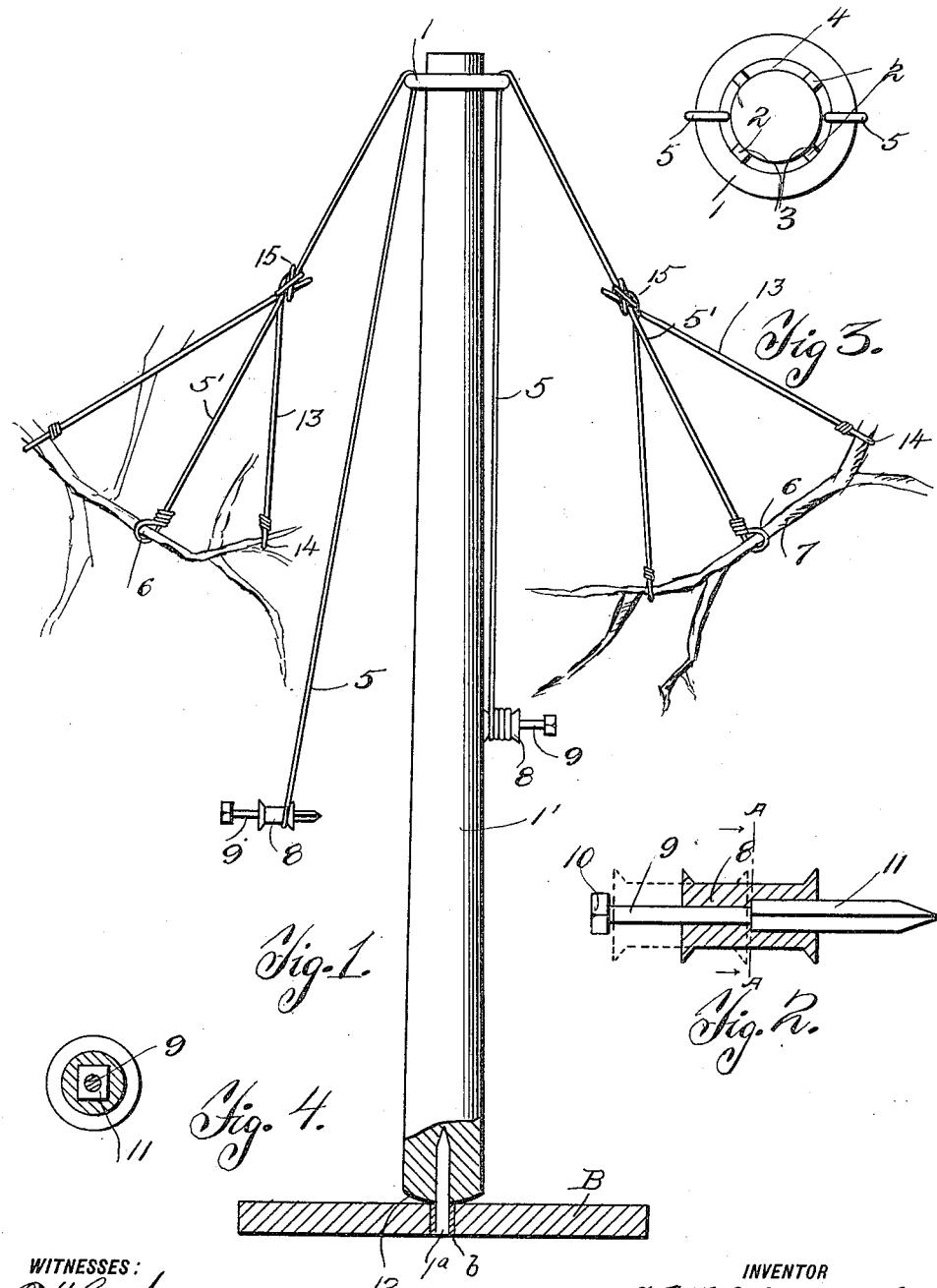

SAMUEL WASHINGTON GLASCOCK, OF CHARLOTTESVILLE, VIRGINIA.

FRUIT-TREE PROP.

1,080,758. Specification of Letters Patent. Patented Dec. 9, 1913.

Application filed October 23, 1911. Serial No. 656,168.

*To all whom it may concern:*

Be it known that I, SAMUEL WASHINGTON GLASCOCK, a citizen of the United States, residing at Charlottesville, in the county of Albemarle and State of Virginia, have invented certain new and useful Improvements in Fruit-Tree Props, of which the following is a specification.

This invention relates to props for supporting the fruit laden limbs or branches of trees, shrubs or vines.

The object of the invention is to provide means by which, when once installed in operative proximity to a tree or trees, the limb supports may be adjusted as to height by the attendant standing at the base of the tree to compensate for the growth of a tree.

A further object of the invention is to provide means at the base of a tree for adjusting the several limb supports, and locking the adjusting means against accidental movement.

With these and minor objects in view, my invention consists in novel features of construction and combinations to be hereinafter described and claimed.

In the accompanying drawings: Figure 1 is an elevation of a prop or pole and its adjuncts embodying my invention. Fig. 2 shows by sectional detail, on a large scale, a spool for adjusting the limb supports, and in side elevation a spike upon which said spool may be either rotated or locked against rotation. Fig. 3 is a plan view of a collar designed to be secured to the prop at a point well above the branches to be supported. Fig. 4 is a transverse section of the spool and spike taken on line A—A of Fig. 2.

In carrying my invention into practical effect I provide a mast or pole 1', the base 12 of which may be seated on the ground in such proximity to the roots of a tree as to project upwardly between the limbs thereof adjacent to the trunk or in an orchard of closely planted dwarf trees, shrubs or vines; said mast or pole 1' may be located in such position that the supports carried thereby may be used on two or more adjacent trees, according to the views of the orchardist. Mounted upon and encircling this pole 1' at a suitable height above the limbs or branches to be supported are a suitable number of collars 1 (only one being shown for purposes of illustration) provided with a number of lugs 2 projecting inwardly therefrom to engage and in the instance shown wedge upon the surface of the pole 1', which preferably, as shown, is made tapering, though this is not essential, as the collar may be secured at a proper height by any means usual and at present well known in this art. As thus constructed, spaces 4 remain between the ring proper and the pole through which a plurality of flexible members, such as cables or wires, are rove, one end 5 thereof depending beside the pole for manipulation by the orchardist, and the other end 5' having a suitable loop 6 to encircle and support the limb or branch 7 of a tree (not shown). Intermediate the collar 1 and loop 6 one or more branch wires 13 are knotted to the main wire 5' by a specially designed knot (not specifically shown or claimed herein) which prevents slip of the parts with relation to each other, the free end of each of such wires being designed to support a separate branch or twig of a tree, as will be understood, but these wires 13 will bear such relation to the main wire 5—5' that any adjustment of said wire 5—5' will result in a corresponding adjustment of the branch wires 13 also.

The cable 5—5' is designed to have free movement over the collar 1 for adjustments, and the lower end of the part 5 is attached to a spool 8 having at one end a cylindric bore and at the other end (which will be adjacent the pole) a polygonal bore as shown in Figs. 2 and 4, said spool being mounted on a spike polygonal in cross section at the point and throughout a portion of its length to fit the polygonal bore of the inner end of the spool 8, and cylindric throughout that part of its length 9 adjacent the head 10 corresponding with the length of the spool 8, whereby, when the spike is driven the required distance into the mast or pole 1' at a height from the ground accessible to a man, the spool may be moved outward from the pole to free the polygonal bore thereof from the correspondingly shaped part 11 of the spike, and thus be free to be rotated to wind or unwind the cable 5, to raise or lower the boughs or branches 7, or moved inward toward the pole to engage the polygonal parts of these members and thus lock the pulley against rotation and hold the boughs, branches or twigs in the position desired.

The base of the pole or post 1' is rounded, as shown at 12, in order that it may rock with the tree under the pressure of wind, and preferably, to avoid lateral displacement, a peg 1ª is lodged therein to enter the ground. In localities where the ground is moist and the post 1' would be apt to sink therein, I employ a base B, of wood or stone, having a central opening $b$ to receive the spike 1ª, and this of necessity will flare downwardly or be of a diameter so much greater than the peg as to permit movement of the lower end of the peg as the post sways with the movement of the tree.

I claim:

1. A device of the kind described comprising a pole; a collar removably supported by said pole, wires doubled over said collar, a doubled wire dependingly carried by one end of each of said first named wires and secured to the limbs of a tree, the other end of said first named wire arranged to be drawn to adjust said depending wires, means for removably attaching the free end of said drawn wire to said post, and means carried by said first named means for winding the wire so as to draw upon it.

2. A device of the kind described comprising a pole, a collar removably supported by said pole, wires doubled over said collar, a doubled wire dependingly carried by one end of each of said first named wires and adapted to be secured to the limbs of a tree, means for drawing the other end of said first named wire to adjust said depending wires, and means engaging said post and said first named means for holding said depending wires in adjusted position.

3. A device of the kind described comprising a pole, a collar removably supported by said pole, a plurality of wires dependingly carried by said collar and adapted to be secured to the limbs of a tree, a depending wire for adjusting said first named wires, a spike having a cylindrical shank and forward polysided enlarged extension, and a spool revoluble upon the shank of said pin around which the free end of each adjusting wire is wound, said spool arranged to engage said polysided extension of the spike to be locked against rotation, and said spike arranged to engage said post.

4. A device of the kind described comprising a pole, a collar removably supported by said pole, a plurality of wires dependingly carried by said collar and adapted to be secured to the limbs of a tree, a depending wire for adjusting said first named wires, a spike engaging said pole, a spool revoluble around said spike upon which the adjusting wire may be wound, and means for locking said spool against rotation on said spike.

5. In a device of the kind described in combination with limb-supporting flexible members, and means for holding said members in position, a spike having a cylindrical shank and forward polysided enlarged extension, and a spool revoluble upon the shank of said spike around which one end of one flexible member is wound, said spool arranged to engage said polysided extension to be locked against rotation, and said spike arranged to engage a fixed abutment.

6. In combination, flexible limb-supporting members, a pole upon which said members may be doubled, a spike arranged to be secured to a fixed abutment, a spool revoluble around said spike upon which one end of one of said members may be wound to move a limb to adjusted position, means for locking said spool against rotation on said spike, and means for supporting said pole.

7. The described device comprising a tapering pole, a collar removably supported thereon, wires doubled over said collar, a wire connected to each of said first wires, a base upon which said pole is seated, the bottom of said pole being rounded whereby it may rock on said base.

8. The described device comprising a tapering pole, a collar removably supported thereon, wires doubled over said collar, a wire connected to each of said first wires, a base upon which said pole is seated, the bottom of said pole being rounded whereby it may rock on said base, said pole having a peg projecting from said bottom and said base having a hole therein to receive said peg.

In testimony whereof I affix my signature in presence of two witnesses.

SAMUEL WASHINGTON GLASCOCK.

Witnesses:
D. F. RINEHART,
J. H. RYALLE.